United States Patent
Chuang et al.

(10) Patent No.: US 10,452,311 B2
(45) Date of Patent: Oct. 22, 2019

(54) HARD DISK MONITORING METHOD AND A HARD DISK MONITORING SYSTEM

(71) Applicants: Pa-I Chuang, Taipei (TW); Chung-Chieh Lee, Taipei (TW)

(72) Inventors: Pa-I Chuang, Taipei (TW); Chung-Chieh Lee, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 631 days.

(21) Appl. No.: 15/216,710

(22) Filed: Jul. 22, 2016

(65) Prior Publication Data
US 2017/0269872 A1    Sep. 21, 2017

(30) Foreign Application Priority Data
Mar. 17, 2016    (TW) .............................. 105108254 A

(51) Int. Cl.
| | |
|---|---|
| *H04R 29/00* | (2006.01) |
| *G06F 3/06* | (2006.01) |
| *G06F 3/16* | (2006.01) |
| *G06F 13/28* | (2006.01) |
| *H04R 1/02* | (2006.01) |
| *H04R 3/04* | (2006.01) |

(52) U.S. Cl.
CPC .......... *G06F 3/0653* (2013.01); *G06F 3/0619* (2013.01); *G06F 3/0676* (2013.01); *G06F 3/165* (2013.01); *G06F 13/28* (2013.01); *H04R 1/028* (2013.01); *H04R 3/04* (2013.01); *H04R 2430/01* (2013.01)

(58) Field of Classification Search
CPC .... G06F 3/0653; G06F 3/0619; G06F 3/0676; G06F 13/28
See application file for complete search history.

(56) References Cited

U.S. PATENT DOCUMENTS

| | | | | |
|---|---|---|---|---|
| 2005/0235167 A1* | 10/2005 | Tiotantra | .............. | G06F 1/3268 713/300 |
| 2014/0153129 A1* | 6/2014 | Chen | ................ | G11B 20/10018 360/65 |
| 2016/0300583 A1* | 10/2016 | Hsu | .................. | G11B 20/10009 |

FOREIGN PATENT DOCUMENTS

TW    I479484    4/2015

OTHER PUBLICATIONS

"Office Action of Taiwan Counterpart Application", dated Oct. 20, 2016, p. 1-p. 6, in which the listed reference as cited.

* cited by examiner

*Primary Examiner* — Simon King
(74) *Attorney, Agent, or Firm* — JCIPRNET

(57) ABSTRACT

A hard disk monitoring method and a hard disk monitoring system are provided. The hard disk monitoring method includes: determining whether a speaker outputs a sound source by using a host system; if the speaker outputs the sound source, determining whether a performance of the hard disk is lower than a threshold by using the host system; if the performance of the hard disk is lower than the threshold, adjusting the sound source signal of the sound source by using the host system. Therefore, the hard disk monitoring method and the hard disk monitoring system inspect the performance of the hard disk when the speaker outputs the sound source. If the performance of the hard disk drops, the volume outputted by the speaker is dynamically turned down to stop the performance drop of the hard disk caused by the vibration generated by the speaker outputting the sound source.

10 Claims, 3 Drawing Sheets

HARD DISK MONITORING METHOD AND A HARD DISK MONITORING SYSTEM

CROSS-REFERENCE TO RELATED APPLICATION

This application claims the priority benefit of Taiwan application serial no. 105108254, filed on Mar. 17, 2016. The entirety of the above-mentioned patent application is hereby incorporated by reference herein and made a part of this specification.

BACKGROUND OF THE INVENTION

1. Field of the Invention

The invention generally relates to a hard disk monitoring method and a hard disk monitoring system, and more particularly to, a hard disk monitoring method and a hard disk monitoring system capable of lowering an influence of speaker vibration on the hard disk by dynamically adjusting a volume of a speaker.

2. Description of Related Art

In typical computer systems, a hard disk is an essential component configured to store user data, and with the evaluation of time, the hard disk has made great progress both in terms of storage capacity and transmission speed. Recently, solid disk drive (SSD) gradually becomes popular, and the SSD has a small volume and is relatively faster than the traditional hard disk regardless in terms of sequential access speed or in terms of a small file access speed, wherein physical properties of the SSD also enable the SSD to be easily placed in a computer system without influencing the normal operation thereof; however, the storage capacity can be bought per unit price of the SSD is still far from the traditional hard disk. Therefore, in the computer system requiring a large amount of storage spaces, such as a server system, the hard disk still has its important role.

Because of the mechanical properties during a hard disk operation (accessing data through reading head and disk rotation), the hard disk is very sensitive to vibration, and as long as there is a little vibration in the surrounding environment of the hard disk, the performance of the hard disk might be affected. Therefore, in the typical computer system, the hard disk is mostly fixed, and an anti-vibration component may even be additionally disposed nearby the hard disk so as to ensure the operation performance of the hard disk.

Speaker is an audio output device in the typical computer system, and the operation of the speaker is usually accompanied by certain degree of vibration. Therefore, if the speaker is placed nearby the computer system, the vibration generated during its operation may possibly influence the operation of the hard disk. Accordingly, a method of disposing a G sensor on the hard disk has been derived, such that when the G sensor senses the vibration and sends a message to the computer system, the computer system may accordingly adjust a sound source to lower a vibration of the hard disk. However, an additional space is required to dispose the G sensor, and an additional cost is also required to be pay. Therefore, how to dynamically adjust the volume of the speaker to prevent the hard disk from being influence by the vibration of the speaker and to operate stability without requiring an additional hardware cost and an additional space is a goal committed by persons skilled in the art.

SUMMARY OF THE INVENTION

The invention provides a hard disk monitoring method and a hard disk monitoring system for resolving a performance drop of a hard disk caused by the vibration generated by a speaker outputting a sound source.

One exemplary embodiment of the invention provides a hard disk monitoring method, which includes: determining whether a speaker outputs a sound source by using a host system. The hard disk monitoring method further includes if the speaker outputs the sound source, determining whether a performance of the hard disk is lower than a threshold by using the host system. The hard disk monitoring method further includes if the performance of the hard disk is lower than the threshold, adjusting a sound source signal of the sound source by using the host system.

In one exemplary embodiment of the invention, the step of determining whether the performance of the hard disk is lower than the threshold by using the host system includes determining whether a transmission rate of the hard disk is smaller than a preset transmission rate by using the host system, and if the transmission rate of the hard disk is smaller than the preset transmission rate, determining the performance of the hard disk to be lower than the threshold by the host system.

In one exemplary embodiment of the invention, the step of determining whether the performance of the hard disk is lower than the threshold by using the host system includes determining whether a communication timeout property or an UltraDMA high-speed transfer mode error count property of the hard disk has encountered an error by using the host system, and if the communication timeout property or the UltraDMA high-speed transfer mode error count property of the hard disk has encountered an error, the performance of the hard disk is determined to be lower than the threshold by the host system.

In one exemplary embodiment of the invention, wherein whether the communication timeout property or the UltraDMA high-speed transfer mode error count property of the hard disk has encountered an error is determined according to an event log generated by inspecting the hard disk.

In one exemplary embodiment of the invention, the step of adjusting the sound source signal of the sound source by using the host system includes adjusting the sound source signal of the sound source through adjusting an equalizer.

In one exemplary embodiment of the invention, the step of adjusting the sound source signal of the sound source by using the host system includes adjusting a volume of the sound source by using the host system.

One exemplary embodiment of the invention provides a hard disk monitoring system, which includes a host system, a hard disk and a speaker. The host system includes an audio codec. The hard disk is coupled to the host system. The speaker is coupled to the host system. The host system determines whether the speaker outputs a sound source by using the audio codec. If the speaker outputs the sound source, the host system determines whether a performance of the hard disk is lower than a threshold. If the performance of the hard disk is lower than the threshold, the host system adjusts a sound source signal of the sound source by using the audio codec.

In one exemplary embodiment of the invention, the host system determines whether a transmission rate of the hard disk is smaller than a preset transmission rate, and if the transmission rate of the hard disk is smaller than the preset transmission rate, the host system determines that the performance of the hard disk is lower than the threshold.

In one exemplary embodiment of the invention, the host system determines whether a communication timeout property or an UltraDMA high-speed transfer mode error count property of the hard disk has encountered an error, and if the communication timeout property or the UltraDMA high-speed transfer mode error count property of the hard disk has encountered an error, the host system determines that the performance of the hard disk is lower than the threshold.

In one exemplary embodiment of the invention, whether the communication timeout property or the UltraDMA high-speed transfer mode error count property of the hard disk has encountered an error is determined according to an event log generated by inspecting the hard disk.

In one exemplary embodiment of the invention, the host system adjusts the sound source signal of the sound source through using the audio codec to adjust an equalizer.

In one exemplary embodiment of the invention, the host system lowers a volume of the sound source through using the audio codec to adjust the sound source signal.

In view of above, the hard disk monitoring method and the hard disk monitoring system in the exemplary embodiments of the invention inspect the performance of the hard disk when the speaker outputs the sound source. If the performance of the hard disk drops, the sound source volume outputted by the speaker is dynamically turned down to stop the performance drop of the hard disk caused by the vibration generated by the speaker outputting the sound source.

In order to make the aforementioned features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
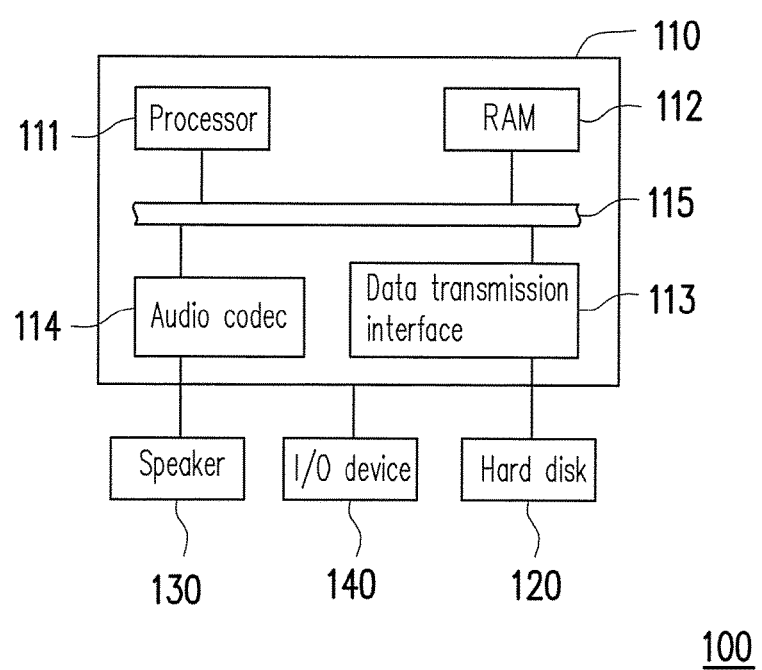
FIG. 1 is a block diagram illustrating a hard disk monitoring system according to an exemplary embodiment of the invention.

FIG. 1 is a block diagram illustrating a hard disk monitoring system according to an exemplary embodiment of the invention.

Referring to FIG. 1, a hard disk monitoring system 100 of the present embodiment includes a host system 110, a hard disk 120, a speaker 130 and other I/O device 140. The host system 110 includes a processor 111, a random access memory (RAM) 112, a data transmission interface 113, an audio codec 114 and a system bus 115.

In the present embodiment, the processor 111, the random access memory 112, the data transmission interface 113 and the audio codec 114 perform data transmissions through the system bus 115. The host system 110 may write data into the hard disk 120 or read data from the hard disk 120 through the data transmission interface 113.

In one exemplary embodiment, the data transmission interface 113 is compatible with a serial advanced technology attachment (SATA) standard. However, it is to be understood that, the invention is not limited thereto. In another exemplary embodiment, the data transmission interface 113 may also comply with an integrated device electronics (IDE) standard, a small computer system interface (SCSI) standard, a serial attached SCSI (SAS) standard, a universal serial bus (USB) standard, a peripheral component interconnect express (PCI Express) standard or other suitable standards. Based on the above, the hard disk 120 may be a hard disk compatible with the SATA standard or other aforementioned standards.

Moreover, the host system 110 also outputs a sound source from the speaker 130 through using the audio codec 114. In one exemplary embodiment, the audio codec 114 may be an audio codec chip implemented by means of a hardware, and may be disposed on a motherboard or be coupled with the host system 110 by means of an external connection. However, it is to be understood that, the invention is not limited thereto. In another exemplary embodiment, the audio codec 114 may also be a program implemented by means of a software or a firmware, and may be compressed or decompressed according to a given digital audio file.

The I/O device 140 may be an input/output device such as a mouse, a keyboard, a display, a printer, a microphone or a drawing board.

In one exemplary embodiment of the invention, the processor 111 of the host system 110 is configured to determine whether the speaker 130 is currently outputting a sound source. For instance, the processor 111 may determine whether the speaker 130 is currently outputting a sound source through determining whether a user is currently playing an audio/video media. If the processor 111 determines that the speaker is currently outputting the sound source, the processor 111 initializes a hard disk performance monitoring module, which is configured to determine whether the performance of the hard disk 120 is lower than a threshold. Specifically, if the processor 111 determines that the speaker is currently outputting the sound source, the hard disk performance monitoring module tests a transmission rate of the hard disk 120, such as to test a sequential reading/sequential writing speed of the hard disk. If the resulting sequential reading/sequential writing speed is smaller than a preset transmission rate, such as 10 MB/s, it indicates that the performance of the hard disk 120 is significantly dropped due to an influence of the vibration generated by the speaker 130 outputting the sound source. The audio codec 114 dynamically adjusts an equalizer to adjust the sound source signal of the sound source so as to lower a sound source volume, thereby reducing the influence on the performance of the hard disk 120 caused by the vibration of the speaker 130. That is to say, the speaker 130 outputs the adjusted sound source signal to lower the sound source volume so as to reduce the influence on the performance of the hard disk 120 caused by the vibration. In the present embodiment, the hard disk performance monitoring module is, for example, a background program during the operation of the host system 110 and is a program software read by the host system 110 from the hard disk 120.

It is noteworthy that, although it is described in the aforementioned exemplary embodiment that whether the performance of the hard disk is dropped is determined by testing the sequential reading/sequential writing speed of the hard disk, it must be understood that, the invention is not limited thereto. In another exemplary embodiment, whether the performance of the hard disk is dropped may also be determined by testing the hard disk transmitting a file with 512K in size or a file with 4K in size, or by testing 4K QD (queue depth) 32.

In another exemplary embodiment of the invention, the processor 111 may also be configured to determine whether the speaker 130 is currently outputting a sound source. If the processor 111 determines that the speaker is currently outputting a sound source, the processor 111 initializes a hard disk performance monitoring module, which is configured to determine whether the performance of the hard disk 120 is lower than a threshold. In the previous exemplary embodiment, the hard disk performance monitoring module determines whether the performance of the hard disk 120 is lower than a threshold through testing the transmission rate of the hard disk 120. A difference between the present exemplary embodiment and the previous exemplary embodiment lies in that, the present exemplary embodiment determines whether the performance of the hard disk 120 is lower than a threshold according to an event log generated by inspecting the hard disk 120.

Specifically, the hard disk performance monitoring module determines, in an information of Self-Monitoring Analysis and Reporting Technology (S.M.A.R.T.), whether the hard disk is in a normal operation state by determining whether a specific test item encounters an abnormality, so as to accordingly determine whether the performance of the hard disk 120 is lower than a threshold. In the present exemplary embodiment, the hard disk performance monitoring module located in the host system 110 is, for example, configured to determine whether a communication timeout property (a hexadecimal code in the S.M.A.R.T. is BC) or an UltraDMA high-speed transfer mode error count property (a hexadecimal code in the S.M.A.R.T. is C7) of the hard disk 120 encounters an error (or warning), and if the communication timeout property or the UltraDMA high-speed transfer mode error count property of the hard disk 120 encounters an error, the hard disk performance monitoring module determines that the performance of the hard disk 120 is lower than the threshold. The audio codec 114 dynamically adjusts the equalizer to adjust the sound source signal of the sound source to lower the sound source volume, so as to reduce an influence on the performance of the hard disk 120 caused by the vibration of the speaker 130.

It is noteworthy that, data of the aforementioned communication timeout property or the UltraDMA high-speed transfer mode error count property may be obtained from the event log generated by inspecting the hard disk 120, and the event log may be generated from a result of inspecting the hard disk 120 by using a hard disk inspection software (e.g., a hard disk inspection software such as CrystalDiskInfo or HD tune).

Figure 2:
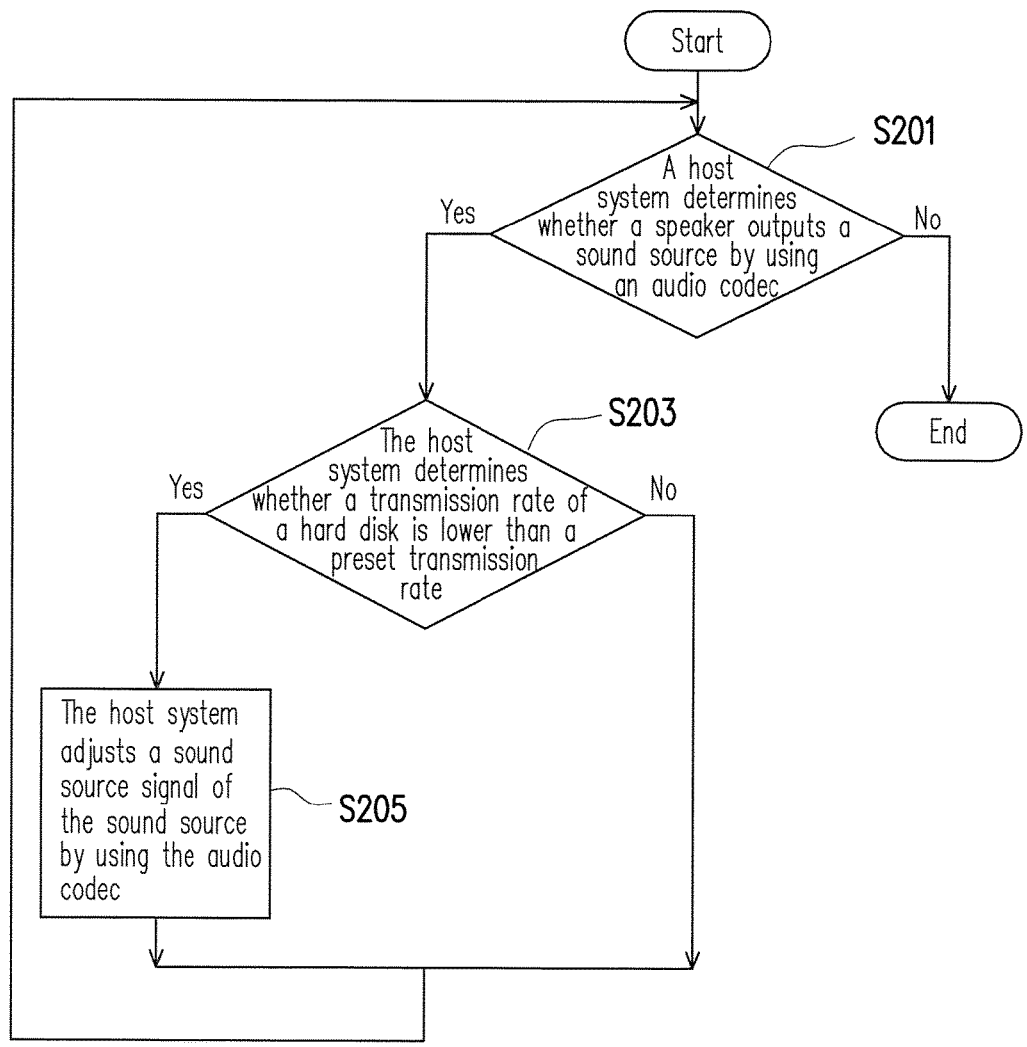
FIG. 2 is a flow chart diagram illustrating a hard disk monitoring method according to an exemplary embodiment of the invention.

FIG. 2 is a flow chart diagram illustrating a hard disk monitoring method according to an exemplary embodiment of the invention.

Referring to FIG. 2, the hard disk monitoring method of the present embodiment is, for example, at least adapted to be applied to the hard disk monitoring system 100 of FIG. 1, except that the invention is not limited thereto. In step S201, the host system 110 determines whether the speaker 130 outputs a sound source by using the audio codec 114. If the speaker 130 does not output the sound source, the host system 110 does not determine a transmission rate of the hard disk 120. If the speaker 130 is currently outputting the sound source, in step S203, the host system 110 determines whether a transmission rate of the hard disk 120 is lower than a preset transmission rate. If the transmission rate of the hard disk 120 is lower than the preset transmission rate, in step S205, the host system 110 adjusts a sound source signal of the sound source by using the audio codec 114 so as to lower a sound source volume, and the method returns back into the step S201, whether the speaker 130 is continuing to output the sound source is being determined. If the transmission rate of the hard disk 120 is not lower than the preset transmission rate, the method directly returns back into the step S201, and whether the speaker 130 is continuing to output the sound source is being determined.

Moreover, teachings, advices and implementation details regarding the hard disk monitoring method of the present embodiment of the invention can be sufficiently found in descriptions of the embodiment in FIG. 1, and thus will not be repeated.

Figure 3:
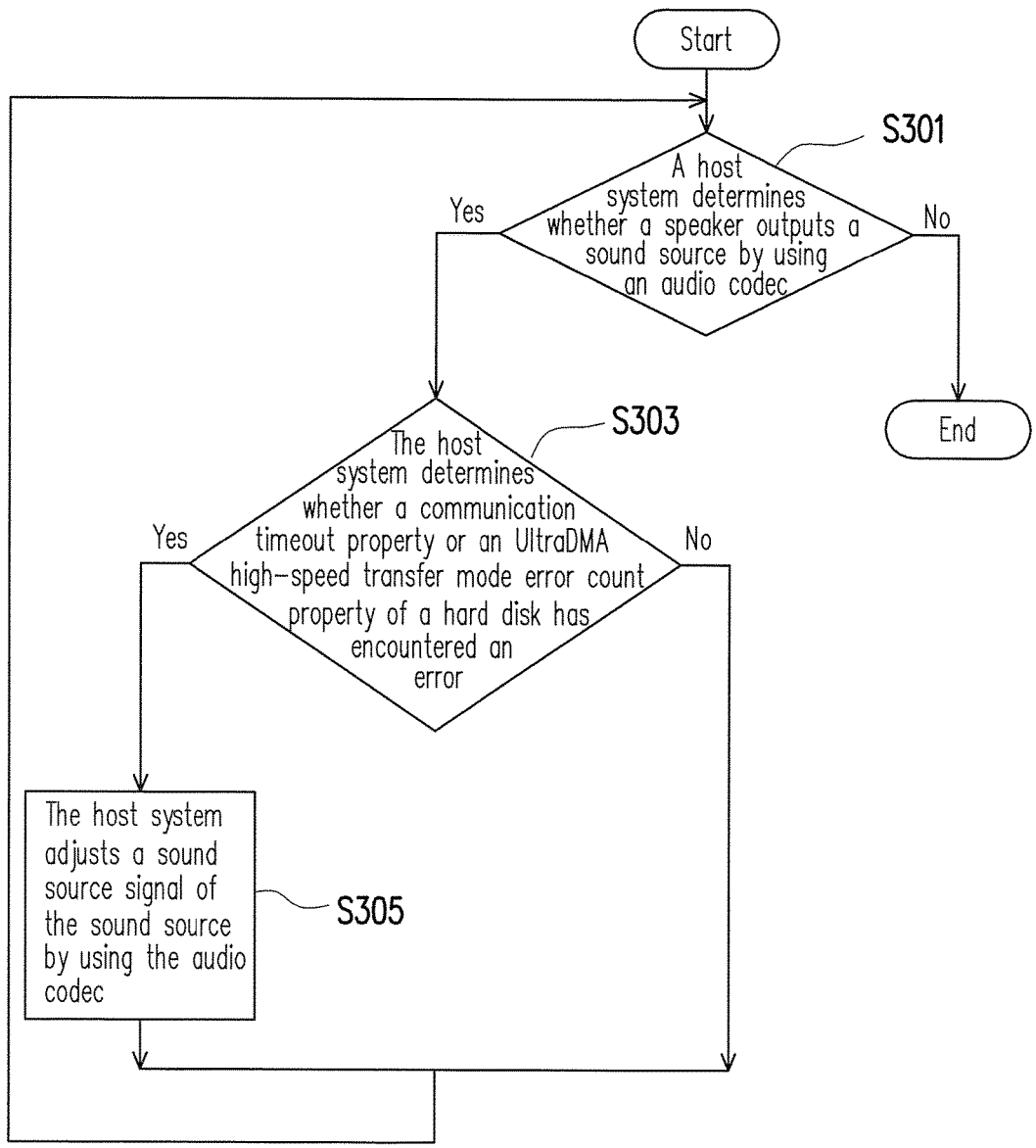
FIG. 3 is a flow chart diagram illustrating a hard disk monitoring method according to another exemplary embodiment of the invention.

FIG. 3 is a flow chart diagram illustrating a hard disk monitoring method according to another exemplary embodiment of the invention.

Referring to FIG. 3, a monitoring method for the hard disk 120 of the present embodiment is, for example, at least adapted to be applied to the hard disk monitoring system 100 of FIG. 1, except that the invention is not limited thereto. In step S301, the host system 110 determines whether the speaker 130 outputs a sound source by using the audio codec 114. If the speaker 130 does not output the sound source, the host system 110 does not determine a property of the hard disk 120. If the speaker 130 is currently outputting the sound source, in step S303, the host system 110 determines whether a communication timeout property or an UltraDMA high-speed transfer mode error count property of the hard disk 120 has encountered an error. If the communication timeout property or the UltraDMA high-speed transfer mode error count property of the hard disk 120 has encountered an error, in step S305, the host system 110 adjusts a sound source signal of the sound source by using the audio codec so as to lower a sound source volume, and the method returns back into the step S301, whether the speaker 130 is continuing to output the sound source is being determined. If the communication timeout property or the UltraDMA high-speed transfer mode error count property of the hard disk 120 has not encountered an error, the method directly returns back into the step S301, whether the speaker 130 is continuing to output the sound source is being determined.

Moreover, teachings, advices and implementation details regarding the hard disk monitoring method of the present embodiment of the invention can be sufficiently found in descriptions of the embodiments in FIG. 1 and FIG. 2, and thus will not be repeated.

In summary, the hard disk monitoring method and the hard disk monitoring system in the exemplary embodiments of the invention determine whether the performance of the hard disk is dropped due to an influence caused by the vibration generated by the speaker outputting the sound source under the condition that the speaker outputs the sound source. If the performance of the hard disk is dropped due to the influence caused by the vibration generated by the speaker outputting the sound source, the hard disk monitoring method and the hard disk monitoring system timely lower the sound source volume so as to enable the hard disk to maintain a proper performance.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A hard disk monitoring method, comprising:
   determining whether a speak outputs a sound source by using a host system;
   if the speaker outputs the sound source, determining whether a performance of a hard disk is lower than a threshold by using the host system; and
   if the performance of the hard disk is lower than the threshold, adjusting a sound source signal of the sound source by using the host system, wherein the step of determining whether the performance of the hard disk is lower than the threshold by using the host system comprises:
      determining whether a communication timeout property or an UltraDMA high-speed transfer mode error count property of the hard disk has encountered an error by using the host system, and if the communication timeout property or the UltraDMA high-speed transfer mode error count property of the hard disk has encountered an error, the performance of the hard disk is determined to be lower than the threshold by the host system.

2. The hard disk monitoring method as recited in claim 1, wherein the step of determining whether the performance of the hard disk is lower than the threshold by using the host system comprises:
   determining whether a transmission rate of the hard disk is smaller than a preset transmission rate by using the host system, and if the transmission rate of the hard disk is smaller than the preset transmission rate, the performance of the hard disk is determined to be lower than the threshold by the host system.

3. The hard disk monitoring method as recited in claim 1, wherein whether the communication timeout property or the UltraDMA high-speed transfer mode error count property of the hard disk has encountered an error is determined according to an event log generated by inspecting the hard disk.

4. The hard disk monitoring method as recited in claim 1, wherein the step of adjusting the sound source signal of the sound source by using the host system comprises:
   adjusting the sound source signal of the sound source through adjusting an equalizer.

5. The hard disk monitoring method as recited in claim 1, wherein the step of adjusting the sound source signal of the sound source by using the host system comprises adjusting a volume of the sound source by using the host system.

6. A hard disk monitoring system, comprising:
   a host system, comprising an audio codec;
   a hard disk, coupled to the host system; and
   a speaker, coupled to the host system,
   wherein the host system determines whether the speaker outputs a sound source by using the audio codec,
   wherein if the speaker outputs the sound source, the host system determines whether a performance of the hard disk is lower than a threshold,
   wherein if the performance of the hard disk is lower than the threshold, the host system adjusts a sound source signal of the sound source by using the audio codec,
   wherein the host system determines whether a communication timeout property or an UltraDMA high-speed transfer mode error count property of the hard disk has encountered an error, and if the communication timeout property or the UltraDMA high-speed transfer mode error count property of the hard disk has encountered an error, the host system determines that the performance of the hard disk is lower than the threshold.

7. The hard disk monitoring system as recited in claim 6, wherein the host system determines whether a transmission rate of the hard disk is smaller than a preset transmission rate, and if the transmission rate of the hard disk is smaller than the preset transmission rate, the host system determines that the performance of the hard disk is lower than the threshold.

8. The hard disk monitoring system as recited in claim 6, wherein whether the communication timeout property or the UltraDMA high-speed transfer mode error count property of the hard disk has encountered an error is determined according to an event log generated by inspecting the hard disk.

9. The hard disk monitoring system as recited in claim 6, wherein the host system adjusts the sound source signal of the sound source through using the audio codec to adjust an equalizer.

10. The hard disk monitoring system as recited in claim 6, wherein the host system lowers a volume of the sound source through using the audio codec to adjust the sound source signal.

* * * * *